United States Patent [19]

Keene et al.

[11] 3,929,346

[45] Dec. 30, 1975

[54] STEERING AXLE ASSEMBLY PROVIDING IMPROVED LATERAL STABILITY

[75] Inventors: Derek K. Keene, Philadelphia; James A. Wahl, Langhorne, both of Pa.

[73] Assignee: Eaton Corporation, Ohio

[22] Filed: Apr. 17, 1974

[21] Appl. No.: 461,569

[52] U.S. Cl............................ 280/87 R; 280/112 A
[51] Int. Cl.² ........................................ B60P 1/02
[58] Field of Search....... 280/106.5 A, 95 R, 112 A, 280/6 R, 6 H, 6.1, 6.11, 111, 112 R, 106 R, 87 R

[56] References Cited
UNITED STATES PATENTS

| | | | |
|---|---|---|---|
| 2,113,094 | 4/1938 | Paton............................... | 280/95 R |
| 2,338,897 | 1/1944 | Boulogne et al................ | 280/112 A |
| 3,341,216 | 9/1967 | Bradford......................... | 280/112 R |
| 3,370,670 | 2/1968 | Love................................ | 280/95 R |
| 3,397,895 | 8/1968 | Kuniskis........................... | 280/6 R |
| 3,423,099 | 1/1969 | Mars................................ | 280/6 R |
| 3,439,927 | 4/1969 | Ryskamp......................... | 280/6 R |
| 3,768,585 | 10/1973 | Matteo............................ | 180/79.2 R |
| 3,792,748 | 2/1974 | Regier............................. | 280/6.1 X |

Primary Examiner—Leo Friaglia
Assistant Examiner—Jack D. Rubenstein
Attorney, Agent, or Firm—Teagno & Toddy

[57] ABSTRACT

An axle assembly is provided for a load lifting vehicle, the assembly including a main frame, a vertical central plane, and a secondary frame extending transversely to the main frame. A first support frame is fixedly attached to the secondary frame and carries a first pivot means. A second support frame is fixedly attached to the main frame and carries a second pivot means, the first and second pivot means being oppositely disposed about the central plane. Link means connect the first and second pivot means permitting angular movement of the main frame, with respect to the secondary frame about either of the pivot means. The angular movement about the oppositely disposed pivot means provides the vehicle with a widened stability pattern.

13 Claims, 9 Drawing Figures

STEERING AXLE ASSEMBLY PROVIDING IMPROVED LATERAL STABILITY

BACKGROUND OF THE DISCLOSURE

The present invention relates to a load lifting vehicle, and more particularly, to a steering axle assembly or trail axle assembly for such a vehicle.

Conventionally, load lifting vehicles, such as "fork lift" trucks, have their drive axles near the front of the vehicle, adjacent the load lifting mechanism, and are steered by means of a trail axle assembly or steering axle assembly at the rear of the vehicle. Typical of the steering axle assemblies now used in load lifting vehicles is that shown in U.S. Pat. No. 3,768,585, assigned to the assignee of the present invention. The axle assembly in the cited patent is rotatably connected to the main frame of the vehicle by the large, longitudinally-extending trunnion in a manner well known in the art and illustrated in U.S. Pat. Nos. 2,829,903 and 3,086,791, both assigned to the assignee of the present invention. This single-trunnion type of mounting permits the axle assembly to rotate with respect to the vehicle about the axis of the trunnion.

An important feature of any load lifting vehicle is its lateral stability pattern, i.e., the imaginary "area" within which the combined center of gravity of the vehicle and load must remain in order to prevent the loaded vehicle from tipping or overturning, when the truck is positioned on a tilting platform in accordance with accepted test procedures. Obviously, as the load is progressively elevated, the load which can be supported by the vehicle without it tipping will correspondingly decrease. Therefore, load lifting vehicles having a particular maximum load capacity must be "de-rated" at higher load elevations, i.e., the rated load capacity must be decreased.

It is obviously desirable to increase (widen) the stability pattern of a load lifting vehicle so that the vehicle does not have to be severely de-rated when carrying elevated loads. However, this cannot be accomplished by merely increasing the wheel base or the track width of the vehicle (which would be undesirable in any event), because the stability pattern (or area) for an articulated-axle load lifting vehicle is the triangle formed by joining the mid-point of the trail axle center line with each of the load wheels, and completing the triangle by joining the two load wheels. The important aspect of the stability pattern are the two lines joining the steering axle mid-point with the load wheels. These lines are commonly referred to as the "overturning" lines.

SUMMARY OF THE INVENTION

Accordingly, it is an object of the present invention to provide an improved load-lifting vehicle having an enlarged (widened) stability pattern, thereby minimizing the amount by which the vehicle must be de-rated when carrying elevated loads.

It is a more specific object of the present invention to provide an improved steering axle assembly which is double-articulated to provide a pair of spaced apart pivot points or articulation points, thereby making the stability pattern a regular trapezoid, rather than an isosceles triangle.

It is a related object of the present invention to provide a steering axle assembly for a load lifting vehicle which enables the vehicle to be made shorter and/or narrower without a corresponding decrease in the stability pattern.

These and other objects of the present invention, which will become apparent upon a reading of the following detailed description, are accomplished by the provision of an improved axle assembly for a load lifting vehicle. The assembly comprises a main frame, a vertical central plane and a secondary frame extending transversely to the main frame. A first support frame is fixedly attached to the secondary frame and carries a first pivot means. A second support frame is fixedly attached to the main frame and carries a second pivot means, the first and second pivot means being oppositely disposed about the central plane. Link means connect the first and second pivot means.

In accordance with a more limited aspect of the present invention, the first support frame is normally in contact with the main frame and permits angular movement of the main frame, with respect to the secondary frame, about the first pivot means. The second support frame is normally in contact with the secondary frame and permits angular movement of the main frame, again with respect to the secondary frame, about the second pivot means.

DESCRIPTION OF THE PREFERRED EMBODIMENTS

Figure 1:
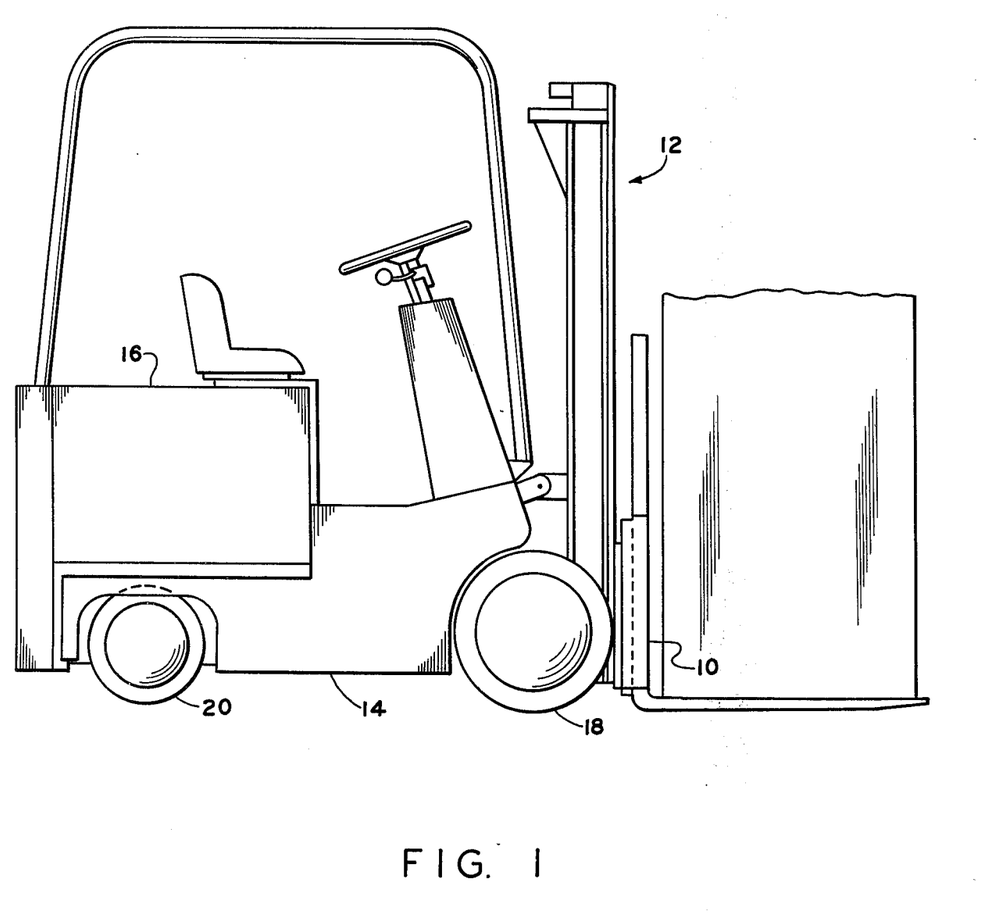
FIG. 1 is an elevation of a typical load lifting vehicle to which the present invention may be applied.

Referring now to the drawings, which are for the purpose of illustrating a preferred embodiment of the invention and not for limiting the same, FIG. 1 is a typical load lifting vehicle on which the load lifting mechanism includes a pair of load forks 10 adapted for vertical movement on a mast 12. The vehicle further comprises a main body portion 14 on which is mounted a power source 16, such as an electric battery or internal combustion engine, which drives a pair of load wheels or traction wheels 18. At the opposite end of the body portion 14 is a pair of trailing wheels 20 by means of which the vehicle can be steered. It should be apparent that the present invention would be equally useful when adapted to a load axle assembly located at the front of the vehicle, with the trailing (steering) wheels located at the rear of the vehicle not being articulated.

The steering axle assembly, of the type described in greater detail in U.S. Pat. No. 3,768,585, referred to previously, and shown herein in FIGS. 2, 3, and 4, comprises an upper main frame member 22 (which is preferably disposed symmetrically about a vertical central plane C) and a lower main frame member 24 interconnecting the pair of trailing wheels 20 by means of steering arm members 26 and 28. The steering control of steering arm members 26 and 28 is provided through linkage members 30 and 32 threadedly mounted at opposite ends of piston rod members 34. The associated linkage members and steering arm members as well as the associated steering arm members and frame members are suitably joined and pivoted by means which, for purposes of simplicity herein, are not illustrated. The piston rod member 34 is axially movable by means of a piston member (not shown) slidably disposed within a power steering hydraulic cylinder 36. The cylinder 36 passes through, and is supported by trunnion member 38 (only partially shown) which is rotatably and slidably seated within a pair of elongated slots 40 extending longitudinally in both the upper and lower main frame members 22,24, which are spaced apart and supported by a front web portion 42 and a rear web portion 44. The steering axle assembly is pivotally attached to the vehicle frame by means of a pair of pivot link assemblies 46,48 welded to the underside of lower frame member 24.

Figure 2:
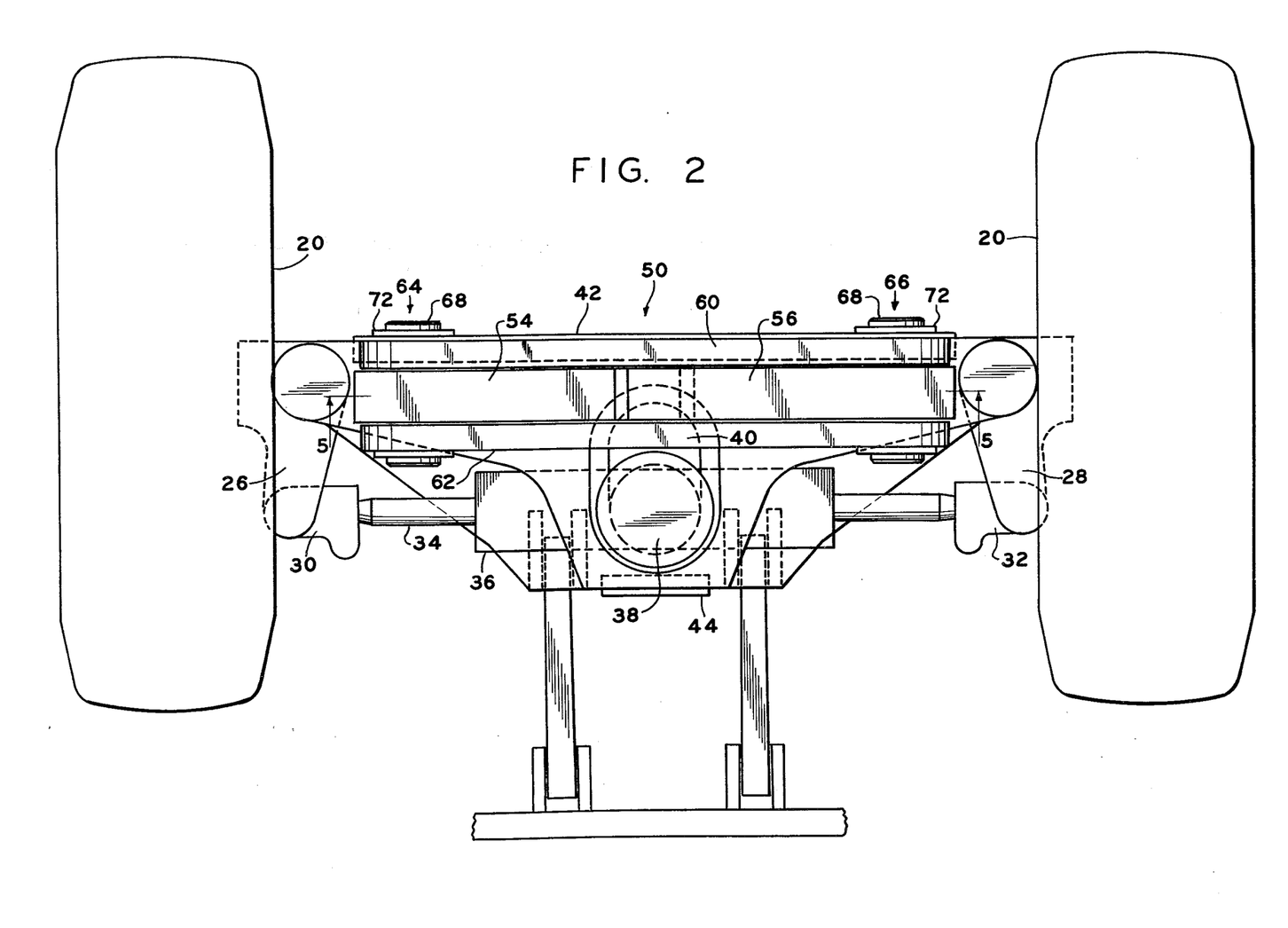
FIG. 2 is a plan view of the apparatus and steering axle assembly of the present invention.
Figure 3:
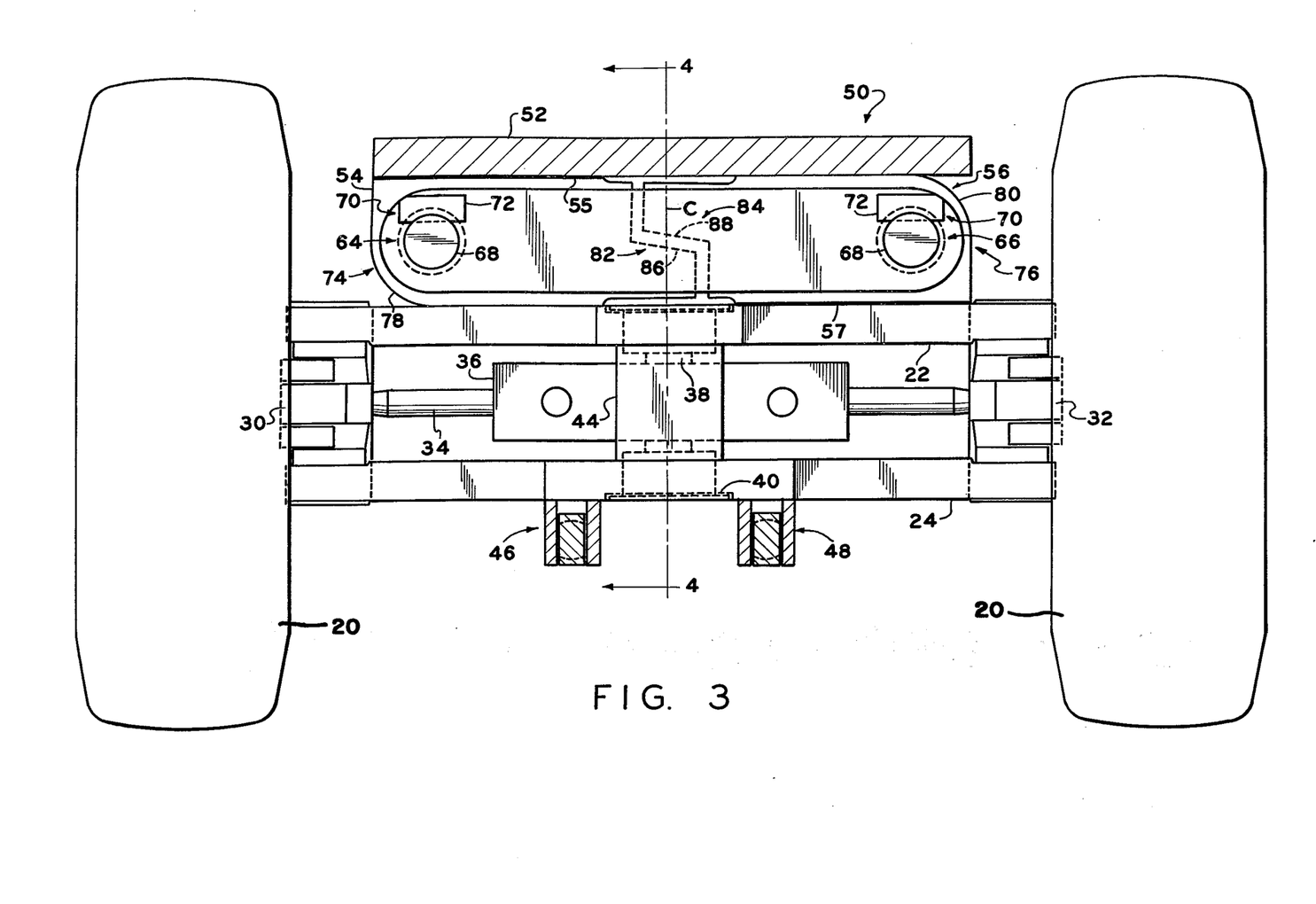
FIG. 3 is an elevational cross sectional view of the apparatus of FIG. 2.
Figure 4:
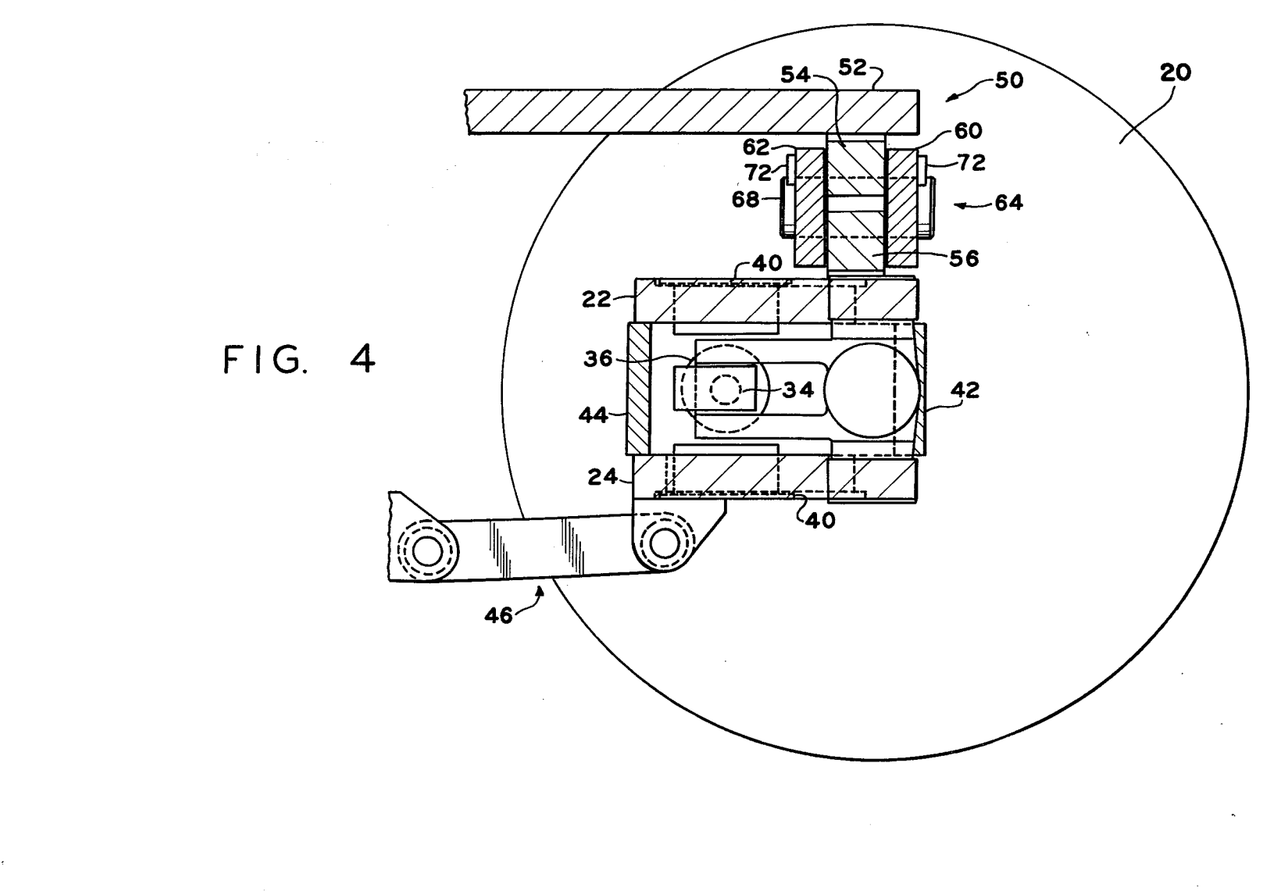
FIG. 4 is a cross-sectional view taken on line 4—4 of FIG. 3.

Referring still to FIGS. 2 - 4, there is shown a double articulated apparatus, generally designated 50, associated with or mounted on the main frame of the steering axle assembly, but preferably, to the upper main frame member 22. In the subject embodiment, the apparatus 50 includes a secondary frame 52 (not shown in FIG. 2) which may be any relatively fixed member or portion of the vehicle. A support frame member 54 is attached, as by weld bead 55, to the secondary frame 52, while a support frame member 56 is similarly attached by weld bead 57 to the upper main frame member 22. The support frame members 54,56 are disposed between a front articulating link 60 and a rear articulating link 62, which are closely spaced to the pair of frame members 54 and 56. The links 60 and 62 are preferably oriented generally perpendicular to the secondary frame 52 and are able to move in a plane which is also generally perpendicular to the secondary frame 52.

The links 60 and 62 are interconnected at the left end of the apparatus 50 by a pivot means 64 to which support frame member 54 is rotatably connected, and at the right end of apparatus 50 by pivot means 66 to which support frame member 56 is rotatably connected. Each of the pivot means 64,66 includes a pivot shaft 68 extending through the respective support frame member and projecting through the front and rear links 60 and 62. In engagement with each end of the pair of pivot shafts 68 is a retainer means 70, the function of which is to maintain the links 60 and 62 in a closely spaced relationship with the frame members 54 and 56. As shown herein, the retainer means 70 comprises a flat plate 72 fastened by suitable means to the surface of the link 60 or 62 and inserted in a notch portion of the pivot shaft 68.

As can best be seen in FIG. 3, the support frames 54 and 56 are elongated, substantially identical members, and during normal operation, support frame 54 is in contact with the upper surface of frame member 22, while support frame 56 is in contact with the underside of secondary frame 52. The support frames 54,56 are mounted for relative rotation with respect to pivot shafts 68 (and the rotational axes thereof) adjacent the end portions 74,76 which preferably include arcuate surfaces 78 and 80. The support frames 54,56 terminate at inner portions 82,84 which define, respectively, stop surfaces 86,88. Preferably the axes of rotation of pivot shafts 68 lie in a normally horizontal plane, and the intersection of the horizontal plane and the central plane C is a line which forms a central axis of the apparatus 50.

OPERATION

Figure 5A:
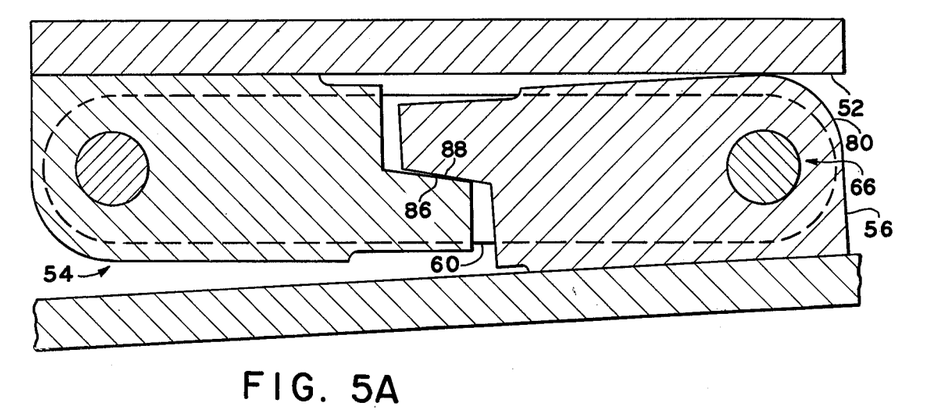
FIGS. 5A and 5B are fragmentary cross-sectional views taken on line 5—5 of FIG. 2, illustrating the operation of the present invention.
Figure 5B:
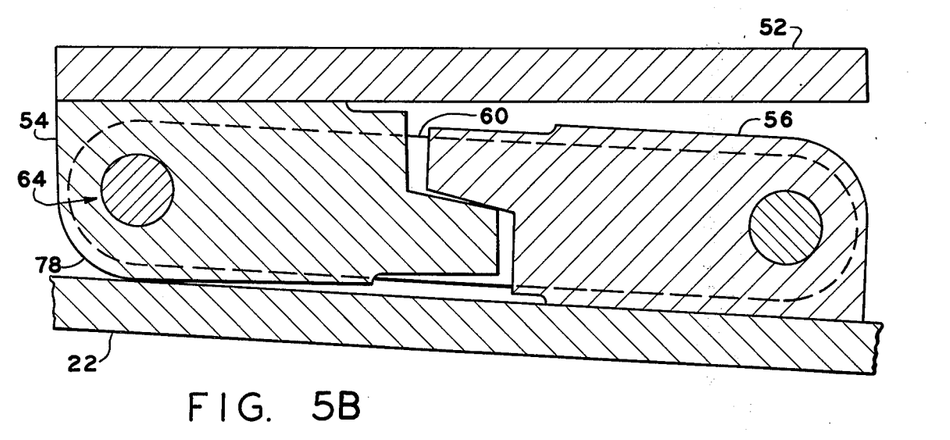

The operation of the present invention can best be understood by referring to FIG. 5, in conjunction with FIGS. 2 – 4. It should first be noted that in both FIGS. 5(A) and 5(B) the secondary frame 52 is illustrated as remaining substantially horizontal, with the upper main frame member 22 moving with respect to frame 52, whereas in actuality, both the frame 52 and frame member 22 would normally tilt, with frame member 22 having the larger angular movement. The term "angular movement" is used herein rather than the term "rotation" primarily because the movement of frame member 22 with respect to secondary frame 52 may not be purely rotational, and the relative movement of frame members 22 and 52 is through a very small angle. In the illustration, the trailing wheels 20 have not been shown, but it should be remembered that, in the subject embodiment, the upper main frame member 22 remains substantially parallel to the remainder of the steering axle assembly interconnecting the pair of wheels 20. In FIG. 5(A), the left wheel has dropped relative to the right wheel, i.e., the left wheel may have fallen into a hole in the floor or the right wheel may have passed over a raised portion of the floor. Because the support frame 54 is attached to the secondary frame 52, it remains in its normally horizontal position, whereas, the support frame 56, attached to frame member 22 rotates therewith until the oppositely disposed stop surfaces 86,88 engage to limit the relative movement of support frame 56 and frame member 22 with respect to the secondary frame 52. During this angular movement the arcuate surface 80 of support frame 56 is in engagement with the undersurface of secondary frame 52, and because arcuate surface 80 rotates about a center of rotation (pivot means 66) which is not free to move transversely with respect to secondary frame 52, the surface 80 slides with respect to the undersurface of frame 52. The links 60 and 62, maintaining pivot shafts 68 on a constant center-to-center distance, do not undergo angular movement, but remain substantially parallel to the secondary frame 52.

In FIG. 5(B), the left wheel has raised with respect to the right wheel, thus tilting the frame member 22 in a direction opposite that shown in FIG. 5(A). The support frame 54 again remains in its normally horizontal position, but this time, the support frame 56 moves out of its normal contact with the secondary frame 52, until the engagement of stop surfaces 86 and 88 terminates the relative angular movement of frame member 22. Again sliding contact occurs, but in this instance, between the arcuate surface 78 of support frame 54 and the upper surface of frame member 22. The links 60 and 62 rotate a few degrees counterclockwise, remaining parallel to upper main frame member 22.

Figure 6:
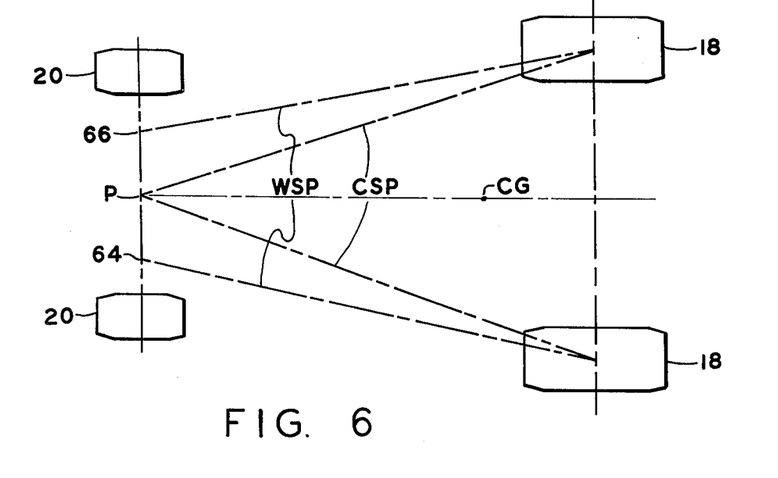
FIG. 6 is a diagrammatic illustration of the vehicle stability pattern.

Referring now to FIG. 6, the effect of the present invention on the stability pattern of a load lifting vehicle to which the invention is applied can be appreciated. With the use of the conventional steering axle assembly, and for the reasons explained previously, the single pivot point, designated P, forms the apex of the conventional stability pattern defined by lines CSP. However, by using the double articulated axle assembly of the present invention, there is now a pair of oppositely disposed pivot points, corresponding to the pair of pivot means 64 and 66, and the lines joining the pivot means and the load wheels 18 define the widened stability pattern defined by lines WSP. In order to prevent the vehicle from tipping it is necessary to maintain the combined center of gravity CG of the vehicle and load within the stability pattern, i.e., if the vehicle is tilted, a vertical line down from the CG must fall within the stability pattern. It has been shown by appropriate testing that the spaced apart pivot points 64,66 result in the overturning lines WSP.

Figure 7A:
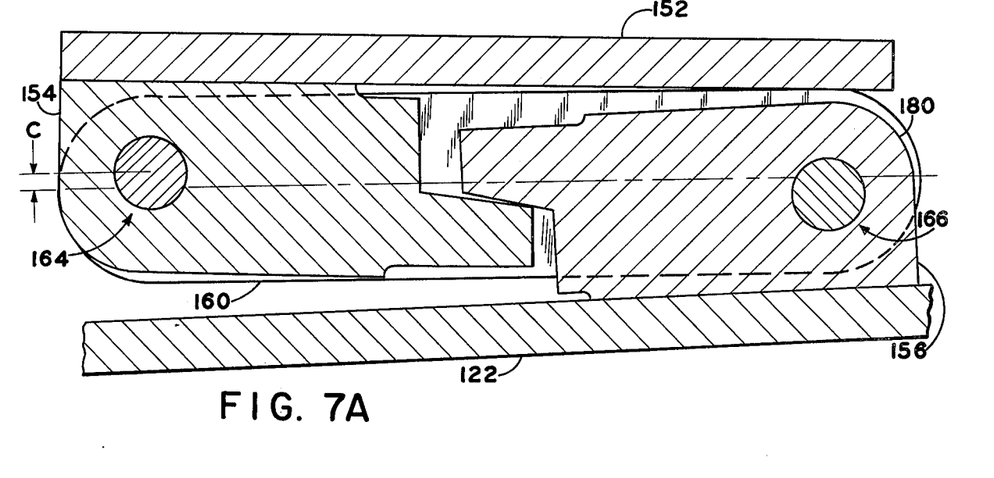
FIGS. 7A and 7B are fragmentary cross-sectional views, similar to FIGS. 5A and 5B, of an alternative embodiment of the invention.
Figure 7B:
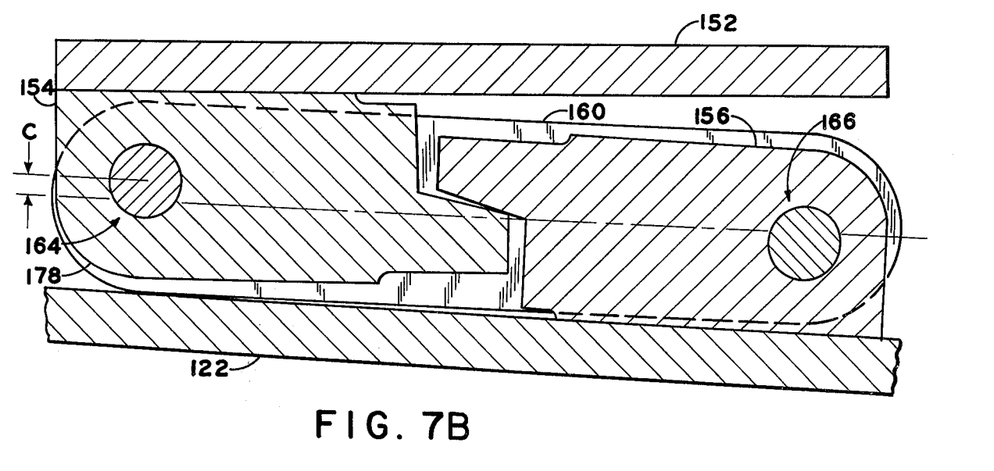

FIG. 7 illustrates an alternative embodiment of the invention, the purpose of which is to eliminate the sliding engagement between arcuate surface 78 and frame member 22, as well as between arcuate surface 80 and secondary frame 52. FIGS. 7A and 7B correspond to FIGS. 5A and 5B, with like elements having like numerals, but with 100 added. In this embodiment, the links 160 and 162 (not shown in FIG. 7) are larger relative to the remainder of the assembly, so that when the left wheel drops relative to the right wheel, as shown in FIG. 7A, the link 160 is in contact with the underside of secondary frame 152, rather than support frame 156, and in FIG. 7B the link 160 is in contact with frame member 122 rather than support frame 154. It should be noted that the links are not mounted symmetrically about pivot means 164 and 166, but as shown in FIG. 7, the link 160 has its axis offset from the axis of rotation of pivot means 164 and 166 by a distance C. Thus, the alternative embodiment operates in the same manner as the embodiment of FIGS. 1 – 5, but without the occurrence of sliding engagement.

The invention has been described in great detail sufficient to enable one of ordinary skill in the art to make and use the same. Obviously, modifications and alterations of the preferred embodiments will occur to others upon a reading and understanding of the specification and it is our intention to include all such modifications and alterations as part of our invention insofar as they come within the scope of the appended claims.

We claim:

1. An axle assembly for a load lifting vehicle having a vertical central plane, comprising:
    a. a main frame;
    b. a secondary frame extending transversely to said main frame and spaced apart therefrom;
    c. a first support frame fixedly attached to said secondary frame and carrying a first pivot means;
    d. a second support frame fixedly attached to said main frame and carrying a second pivot means, said first and second pivot means being oppositely disposed about said central plane;
    e. link means connecting said first and second pivot means; and
    f. stop means operatively associated with said first and second support frames to limit relative angular movement therebetween, one of said first support frame and said link means normally being in contact with said main frame to permit angular movement of said main frame, with respect to said secondary frame, about said first pivot means, and one of said second support frame and said link means normally being in contact with said secondary frame to permit angular movement of said main frame, with respect to said secondary frame, about said second pivot means.

2. The axle assembly of claim 1 wherein said first and second pivot means define substantially parallel axes of rotation, said axes defining a generally horizontal central plane.

3. The axle assembly of claim 2 wherein said main frame and said secondary frame are normally parallel to, and equally and oppositely disposed from said horizontal central plane.

4. The axle assembly of claim 1 wherein said link means comprises first and second elongated link members oppositely disposed about said first and second support frames and closely spaced thereto.

5. The axle assembly of claim 1 wherein said first and second pivot means comprise, respectively, first and second pivot shafts extending through said first and second support frames and said link means comprises at least one elongated link member fixedly connected to said pivot shafts.

6. The axle assembly of claim 1 wherein:
    a. said link means is normally in contact with said main frame adjacent said first support frame and permits angular movement of said main frame, with respect to said secondary frame, about said first pivot means; and
    b. said link means is normally in contact with said secondary frame adjacent said second support frame and permits angular movement of said main frame, with respect to said secondary frame, about said second pivot means.

7. The axle assembly of claim 6 wherein said link means comprises an elongated link member having a longitudinal axis, said axis being offset from the axis of said first pivot means towards said main frame and said axis being offset from the axis of said second pivot means toward said secondary frame.

8. The axle assembly of claim 6 wherein said first support frame is normally spaced apart from said main frame and said second support frame is normally spaced apart from said secondary frame.

9. In a steering axle assembly for a load lifting vehicle, including a main frame, a vertical central plane, and means associated with the frame for steering a pair of wheels, the improvement comprising:
    a. a secondary frame extending transversely to the main frame, oppositely disposed therefrom and normally approximately parallel thereto;
    b. a first support frame fixedly attached to said secondary frame and having a first pivot shaft rotatably supported therein;
    c. a second support frame fixedly attached to the main frame and having a second pivot shaft rotatably supported therein, said first and second pivot shafts being oppositely disposed about said central plane;
    d. a pair of transversely extending, elongated articulating links oppositely disposed about said first and second support frames and connecting said first and second pivot shafts to permit angular movement of the main frame, with respect to said secondary frame, about either of said pivot shafts, said angular movement about said oppositely disposed pivot shafts providing a widened stability pattern for the vehicle; and
    e. stop means operatively associated with said first and second support frames to limit said angular movement of the main frame with respect to said secondary frame, about either of said pivot shafts.

10. In a load lifting vehicle including an elevatable load carriage, a pair of ground-engaging wheels, a vertical central plane and a vehicle frame portion extending transversely of the vehicle, a steering axle assembly connecting the wheels, comprising:
  a. a main frame, oppositely disposed from the vehicle frame portion;
  b. a first support frame fixedly attached to the vehicle frame portion and carrying a first pivot means;
  c. a second support frame fixedly attached to said main frame and carrying a second pivot means, said first and second pivot means being oppositely disposed about said central plane;
  d. link means connecting said first and second pivot means and maintaining said first and second pivot means on a substantially constant center-to-center distance; and
  e. said first support frame is normally in contact with said main frame and said second support frame is normally in contact with the vehicle frame portion to permit angular movement of said main frame, with respect to the vehicle frame portion, about either of said pivot means.

11. The steering axle assembly of claim 10 wherein said first and second pivot means defines substantially parallel axes of rotation, said axes defining a generally horizontal central plane.

12. The steering axle assembly of claim 11 wherein said main frame and the vehicle frame portion are normally parallel to, and equally and oppositely disposed from, said horizontal central axis.

13. The steering axle assembly of claim 10 wherein said link means comprises a pair of link members oppositely disposed about said first and second support frames and closely spaced thereto.

* * * * *